United States Patent [19]

Holland

[11] Patent Number: 4,591,778
[45] Date of Patent: May 27, 1986

[54] CURRENT PULSE PRODUCING CIRCUIT

[75] Inventor: Varnum S. Holland, Amherst, N.H.

[73] Assignee: Solid State Chargers Research & Development, Lutherville, Md.

[21] Appl. No.: 643,299

[22] Filed: Aug. 22, 1984

[51] Int. Cl.⁴ .............................................. H02J 7/04
[52] U.S. Cl. ...................................... 320/39; 320/22; 363/147
[58] Field of Search ........................... 320/22, 39, 40; 363/127, 147

[56] References Cited

U.S. PATENT DOCUMENTS 4,504,774 3/1985 Hoffman ................ 320/39

Primary Examiner—Peter S. Wong
Assistant Examiner—Anita M. Ault
Attorney, Agent, or Firm—Leonard Bloom

[57] ABSTRACT

A direct current pulse producing circuit, which can be connected in series with a battery or battery pack to be charged or recharged, or in series with a smoothing circuit of a D.C. power supply, includes Darlington configured transistors forming part of a current amplifier. The pulse producing circuit can be directly connected in series with the battery or battery pack, or the smoothing circuit across a conventional A.C. 117 volt, 60 Hz. voltage source. The direct current pulse producing circuit may be realized as monolithic integrated circuit, and includes a rectifying diode, one electrode of the rectifying diode being formed by at least part of a substrate upon which the circuit is formed. Circuit components are formed in the monolithic circuit which effect the cancelling of undesired current caused by parasitic transistor action resulting from use of the substrate or a portion thereof as an electrode of a rectifying diode. The undesired current is in effect cancelled by a mirror current of substantially equal magnitude and opposite direction with respect to the undesired current.

41 Claims, 10 Drawing Figures

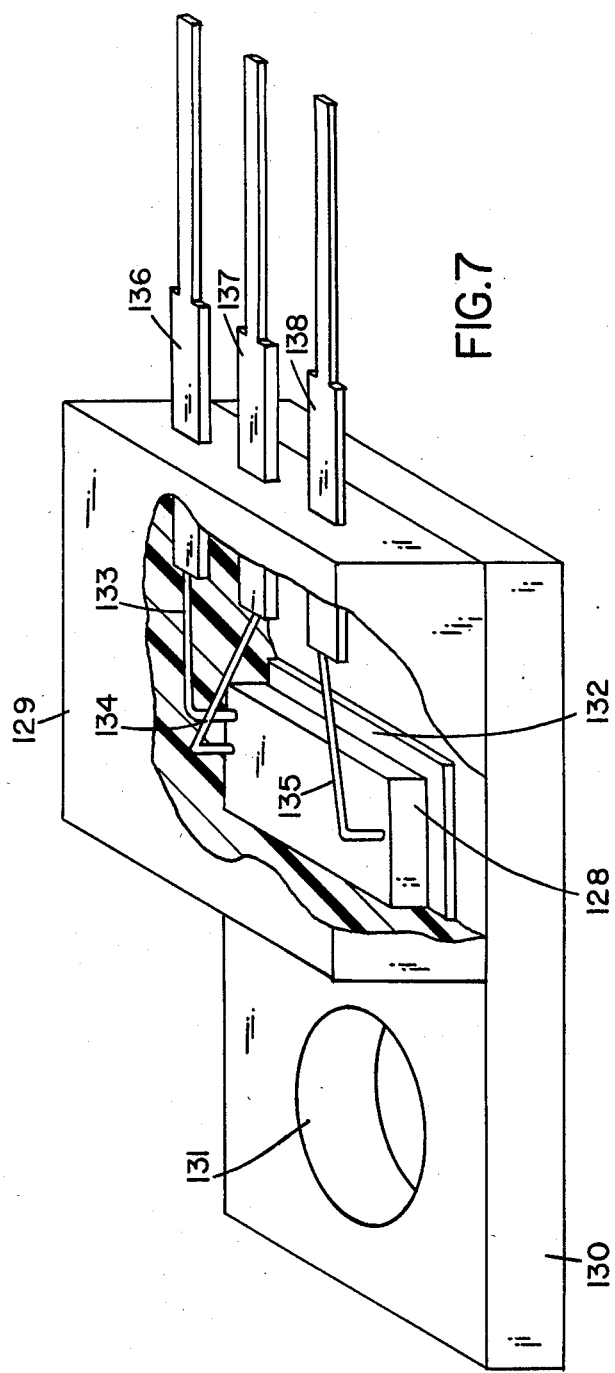

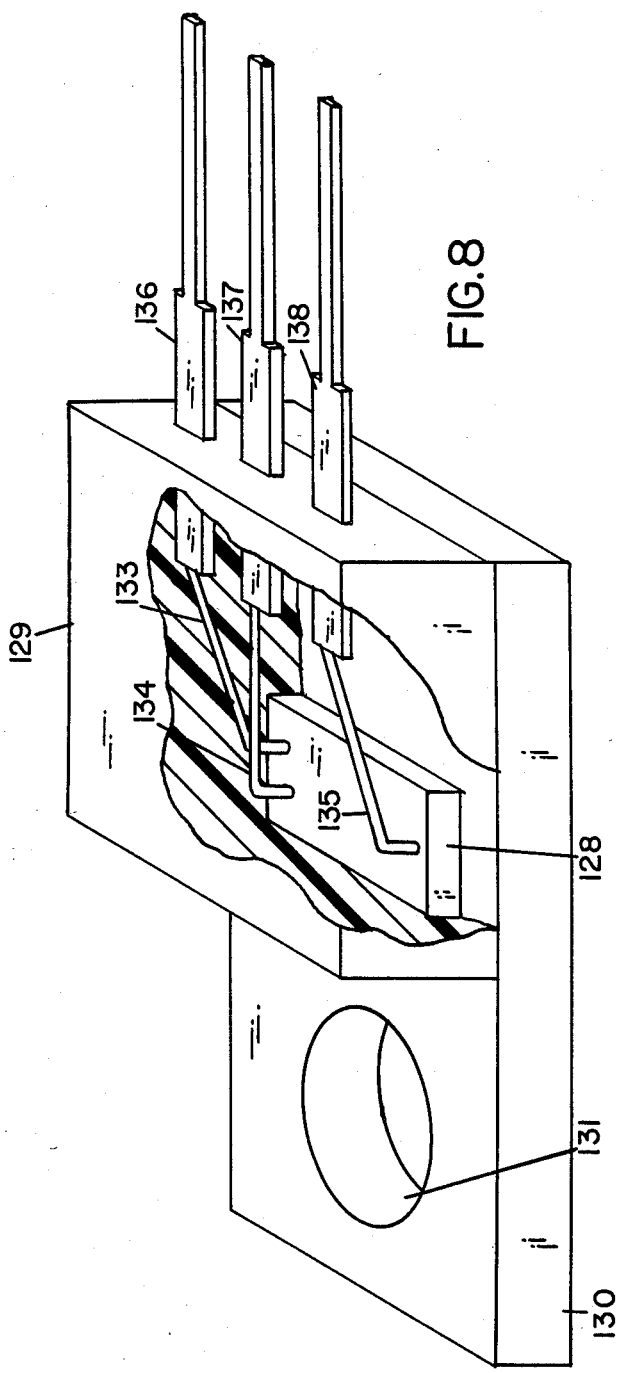

CURRENT PULSE PRODUCING CIRCUIT

FIELD OF THE INVENTION

The present invention relates to a direct current pulse producing circuit, which may be realized as an integrated circuit and, more particularly, to such a circuit which can be used as a portion of a D.C. power supply or as a battery charging circuit. The current pulse producing circuit can be fabricated as a relatively small solid state component and can be incorporated directly into a power cord, power plug, battery charger, a battery-operated tool or appliance, or associated with a smoothing filter or the like to provide a D.C. power supply.

BACKGROUND OF THE INVENTION

While not restricted thereto, this invention finds immediate application in simple, inexpensive power supplies and in simple, inexpensive battery charging circuits and the like. The battery charging circuits are especially useful for charging batteries used in portable battery-operated devices such as household appliances, soldering pencils, shavers, cordless telephones, calculators, computers, television sets, radios, recorders, electric garden tools, cordless hand tools including cleaning, woodworking and metalworking tools, and the like. The present invention also finds direct application in D.C. power supplies suitable for use in radios, recorders, shavers, calculators, computers, recorders, cleaning, woodworking and metalworking tools, household appliances, and the like.

Integrated circuit realizations of the present invention are simple, inexpensive to make and may be readily incorporated directly into the devices to be powered, into power cords and into plugs which are attached to power cords.

Battery-operated cordless devices and other battery-operated devices, such as hand tools, have considerable popularity because of the convenience afforded by these devices. Tools and appliances of this type are customarily provided with a small D.C. electric drive motor which is energized by one or more rechargeable batteries incorporated within the tool housing and operatively associated with the electric drive motor. When the device is a television set, radio, recorder or the like, the rechargeable batteries supply D.C. power to the circuits therein either exclusively or alternatively, in instances in which an A.C. power cord and plug are provided. The elimination of a conventional electric cord or its alternative use increases the freedom with which the user of the cordless device can move about, eliminating the inconveniences of clearing the power cord from obstacles with which it may otherwise become entangled and reducing the necessity of having electric wall outlets available at every place the device is to be used. It has become customary to provide cordless devices, such as cordless garden tools and woodworking tools with rechargeable batteries so as to avoid the necessity of frequent battery replacements, and to reduce the cost of operation. The present day rechargeable batteries, properly maintained with a special charge, have an extended life and greatly enhanced convenience with which the cordless device may be operated.

Most cordless devices, such as cordless hand tools and the like, operate from a D.C. battery potential of only a few volts.

It is known from U.S. Letters Pat. No. 3,943,423 to Philip A. Hoffman entitled "Battery Charging Circuit" and issued on Mar. 9, 1976 to provide a battery charging circuit which eliminates the need for a relatively bulky and heavy voltage step-down transformer, and which, when recharging batteries in a hand tool or the like, needs simply to be connected to a conventional, 117 volt 60 Hz. household outlet and to the battery, battery-pack cell or cells which are to be recharged. Other outlet voltage levels and/or supply frequencies can be used as well. The known charging circuit of the aforesaid Hoffman patent comprises a variable resistance switch preferably realized in the form of a NPN junction transistor and Darlington-connected other transistors, operatively associated with a feedback circuit. This known circuit produces current pulses which effect charging of a battery or battery pack, and has, in addition to the transistors and resistors, two rectifying diodes and two capacitors.

It is known from the further U.S. Letters Pat. No. 3,970,912 issued on July 20, 1976 to Philip A. Hoffman and entitled "Battery Charging Circuit" to provide a battery charging circuit free of transformers and operatively arranged to produce current pulses which are supplied to the battery or batteries to be recharged via the inductance of an electric motor, which forms part of a cordless hand tool or the like.

A considerable number of battery chargers have been proposed and are known from the general prior art including U.S. Letters Patents identified as follows:

| Numbers   | Patentees                  | Issue Dates         |
| --------- | -------------------------- | ------------------- |
| 3,217,229 | Lyttleton W. Ballard       | November 9, 1965,   |
| 3,381,639 | Norman N. Potter et al.    | October 25, 1966,   |
| 3,563,800 | Harry G. Oswin et al.      | February 16, 1971,  |
| 3,735,233 | Richard B. Ringle          | May 22, 1973,       |
| 3,875,921 | John H. Bigbee, III        | April 8, 1975,      |
| 4,013,934 | George J. Frye             | March 22, 1977,     |
| 4,140,958 | Charles R. Groeschel       | February 20, 1979,  |
| 4,158,813 | Robert W. Ellis et al.     | June 19, 1979,      |
| 4,162,439 | Arthur Schneider           | July 24, 1979,      |
| 4,186,335 | Harold J. Cahill           | January 29, 1980,   |
| 4,220,905 | William T. Quarton         | September 2, 1980,  |
| 4,266,178 | Tatsushi Asakawa           | May 5, 1981,        |
| 4,292,578 | Robert L. Steigerwald et al. | September 29, 1981, |
| 4,321,523 | Ronald O. Hammel           | March 23, 1982 and  |
| 4,348,619 | Ray et. al.                | September 7, 1982.  |

It is well known to use Zener diodes in voltage regulators to assure that voltage at a given circuit point does not exceed a given level; an example of such a circuit is disclosed in U.S. Letters Pat. No. 3,530,367 to Robert A. Gardenghi issued Sept. 22, 1970 and entitled "Zener Diode Voltage Regulator Circuit."

It is also known from Mims III "Engineer's Notebook A Handbook of Integrated Circuit Applications", First Edition, Second Printing, pg. 95, Radio Shack, A division of Tandy Corporation, U.S.A. (1970) to use integrated circuits in battery chargers.

Fabrication techniques for making semiconductor devices, including transistors and integrated circuits, and the devices themselves have become well known from a considerable number of publications. Among these publications are a book Grove, *Physics and Technology of Semiconductor Devices*, John Wiley and Sons, New York, New York (1967) and a book Sze, *Physics of*

*Semiconductor Devices,* John Wiley and Sons, New York, New York (1969).

Active circuit parasitic transistor effects are known as phenomena, and often cause problems in integrated circuits, especially monolithic single-crystal integrated circuits, as recognized, for example, in Warner Jr. et al., *Integrated Circuits Design Principles and Fabrications,* pgs. 169, 204–207, McGraw-Hill Book Company, New York, New York (1965) and in Meyer et al., *Analysis and Design of Integrated Circuits,* pgs. 30–31, McGraw-Hill Book Company, New York, New York (1968). The conventional solution is to design the integrated circuit so that the active parasitic transistors have very low gain, are spaced at considerable distances from components with which they may interfere, are isolated from other circuit components by intrinsic zones or the like and/or remain OFF during predetermined ON times of desired circuit components.

SUMMARY OF THE INVENTION

An object of the present invention is to provide a current pulse producing circuit particularly useful for charging batteries.

Another object of the present invention is to provide a current pulse producing circuit particularly useful in D.C. power supplies.

An additional object of the present invention is to provide a current pulse producing circuit which can be realized as an integrated circuit, is simple, inexpensive, small and lightweight and which can be incorporated directly into a battery-operated device or into a D.C. power supply.

A further object of the present invention is to provide a simple, inexpensive pulse producing circuit which can be operated from a conventional 117 volt, 60 Hz. or 234 volt, 60 Hz. power sources, which can be used to charge batteries, can be used in D.C. power supplies and requires no step-down transformer or capacitive voltage divider or the like.

Yet another object of the present invention is to provide a battery charging circuit which incorporates a current pulse producing circuit constructed according to the present invention.

Yet an additional object of the present invention is to provide a D.C. power supply which incorporates a current pulse producing circuit constructed according the present invention.

In one aspect the present invention can be seen as a direct current pulse producing circuit which includes means for connection to at least one energy storing component of a D.C. power supply, means for connection to an electrical power source, a rectifying means for producing unfiltered rectified D.C. voltage and an electrical charging circuit coupling the input means to the means for connection for supplying D.C. charging current pulses thereto. The controlling circuit means and charging current carrying means are coupled to receive output from the rectifying means. The controlling circuit means is free of feedback, particularly current feedback, from the charging current carrying means and is solely responsive to the instantaneous level of the unfiltered rectified D.C. voltage and voltage across the energy storing component for controlling the charging current carrying means to allow conduction thereof only during periods when the instantaneous level of the unfiltered D.C. voltage is substantially between a first level greater than the voltage across the energy storing component and a second higher level which exceeds the first level by substantially a given amount and to prevent conduction during periods when the instantaneous level of the unfiltered D.C. voltage exceeds the second level.

In another aspect, the present invention is a battery charger which includes means for connection to at least one battery or cell, input means for connection to an electrical power source, rectifying means for producing unfiltered rectified D.C. voltage and an electrical charging circuit coupling the input means to the means for connection for supplying D.C. charging current pulses thereto. The charging circuit includes controlling circuit means and charging current carrying means coupled to receive output from the rectifying means. The controlling circuit means is free of feedback, particularly current feedback, from the charging current carrying means and is solely responsive to the instantaneous level of the unfiltered rectified D.C. voltage and battery or cell voltage for controlling the charging current carrying means to allow conduction thereof only during periods when the instantaneous level of the unfiltered D.C. voltage is substantially between a first level greater than the battery or cell voltage and a second higher level which exceeds the first level by substantially a given amount and to prevent conduction during periods when the instantaneous level of the unfiltered D.C. voltage exceeds the second level.

In a further aspect, the invention can be viewed as a direct current pulse producing circuit which includes output means for delivering direct current pulses to a utilization circuit, means for connection to an A.C. power source and rectifying means for providing an unfiltered, rectified D.C. voltage. A controlling circuit means and current pulse carrying means, each coupled to receive output from the rectifying means, are provided. The current pulse carrying means is coupled to the controlling circuit means and is responsive to its output. The controlling circuit means is free of feedback, particularly current feedback, from the current pulse carrying means and is solely responsive to the instantaneous level of the unfiltered rectified D.C. voltage and voltage across the output means for controlling the current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level.

In an addition aspect, the present invention can be considered as a direct current pulse producing circuit comprising, in combination, output means for delivering direct current pulses to a utilization circuit, means for connection to an A.C. power source, rectifying means for providing an unfiltered, rectified D.C. voltage, controlling circuit means and current pulse carrying means each coupled to receive output from said rectifying means, and current limiting means. The current limiting means is coupled between the means for connection to an A.C. power source and control inputs of the controlling circuit means and the current pulse carrying means for limiting current to control inputs thereof. The current pulse carrying means is coupled to the controlling circuit means and responsive to its output. The controlling circuit means is responsive to the instantaneous level of the unfiltered rectified D.C. voltage and voltage across the output means for controlling the current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level.

In yet another aspect, the present invention is a direct current pulse producing integrated circuit having at least one parasitic transistor action which results in an unwanted current flow at at least one circuit point. The circuit includes, in combination, output means for delivering direct current pulses to a utilization circuit, means for connection to an A.C. power source, rectifying means for providing an unfiltered, rectified D.C. voltage, and controlling circuit means and current pulse carrying means. Means which may form part of the integrated circuit are provided to negate the unwanted current caused by the parasitic transistor action. The controlling circuit means and the current pulse carrying means are each coupled to receive output from the rectifying means, the current pulse carrying means being coupled to the controlling circuit means and responsive to its output. The controlling circuit means is responsive to the instantaneous level of the unfiltered rectified D.C. voltage and voltage across the output means for controlling the current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level.

In yet a further aspect, the present invention can be viewed as a direct current pulse producing circuit including, in combination, output means for delivering direct current pulses to a utilization circuit, means for connection to an A.C. power source, rectifying means for providing an unfiltered, rectified D.C. voltage, and controlling circuit means, including means for receiving a control signal, and current pulse carrying means. The current pulse carrying means and the controlling circuit means are each coupled to receive output from the rectifying means. The current pulse carrying means is coupled to the controlling circuit means and responsive to its output. The controlling circuit means is responsive to the instantaneous level of the unfiltered rectified D.C. voltage and voltage across the output means for controlling the current pulse carrying means to allow conduction thereof only during periods when the instantaneous level of the unfiltered D.C. voltage is substantially between a first level greater that the voltage across the output means and a second higher level which exceeds the first level by substantially a given amount and to prevent conduction during periods when the instantaneous level of the unfiltered D.C. voltage exceeds the second level. The controlling circuit means is further responsive to the control signal to action a turn off of the current pulse carrying means when the control signal is present.

The invention can also be seen as being in a current pulse producing circuit comprised at least in part by an integrated ciruit wherein at least one parasitic transistor action results in undesired current flow at at least one circuit point. Means are provided for producing a second current at the circuit point which is substantially of equal magnitude and opposite direction with respect to the undesired current. Thus, the undesired current at the one circuit point resulting from the parasitic transistor effect is substantially negated.

Were the output means a battery, battery pack, cell or cells being formed or recharged, the control signal could be a signal indicative of the battery, battery pack, cell or cells having become substantially fully charged.

In the case that the output means is a smoothing circuit of an off-line D.C. power supply or the like, the control signal could be indicative of the desired D.C. output level having been achieved, thus providing a voltage regulated output.

BRIEF DESCRIPTION OF THE DRAWINGS

FIG. 7 is a pictorial view of one arrangement of leads and a housing, part of the housing being broken away to show the integrated circuit of the present invention and its relationship to leads and a heat sink.

FIG. 8 is a pictorial view of a second arrangement of leads and a housing, part of the housing being broken away to show the integrated circuit of the present invention and its relationship to leads and a heat sink.

DETAILED DESCRIPTION OF THE PREFERRED EMBODIMENTS

Figure 1:
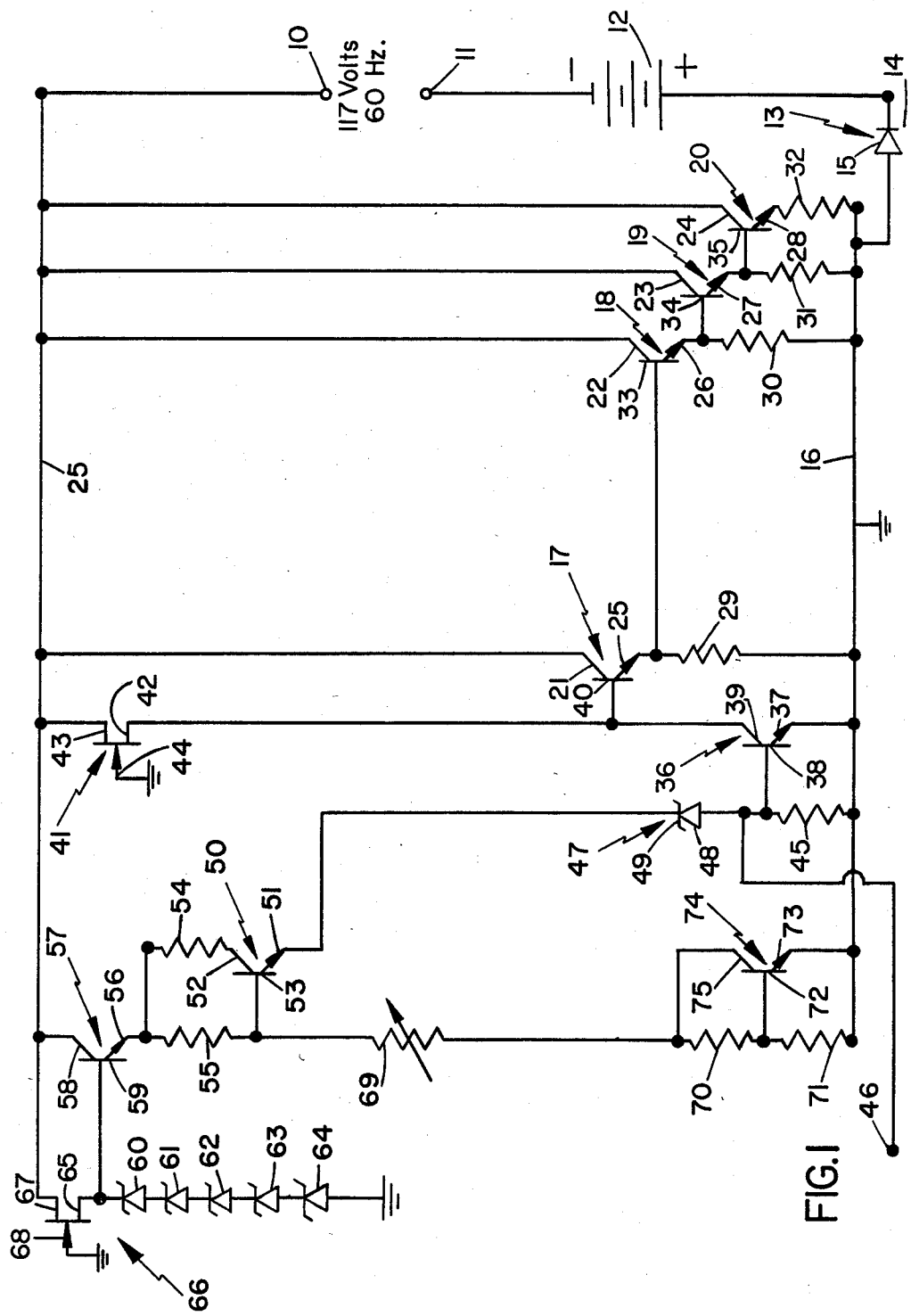
FIG. 1 is a schematic circuit diagram of an exemplary, illustrative embodiment of a current pulse producing circuit according to the present invention, the circuit being shown associated with a battery to be charged and a conventional 117 volt, 60 Hz. A.C. power source.

Referring to FIG. 1, an exemplary, illustrative embodiment of current pulse producing circuit, which may be made of discrete components, or preferably be realized as an integrated circuit, in particular a monolithic integrated circuit, is illustrated in series connection with a pair of commercial, A.C. power input-terminals 10, 11 which are shown connected in series with a battery 12 to be formed, charged or recharged. As illustrated, the terminals 10, 11, are shown connected directly to a source of 117 volt, 60 Hz. power, no transformer being necessary. Although the battery 12 is shown as a single battery, it could as well be a power pack which could include several batteries or cells in series or parallel.

The direct current pulse producing circuit includes a rectifing diode 13, having its cathode 14 connected to the positive terminal of the battery 12 and its anode connected to reference ground 16. In the monolithic integrated circuit version, the point of reference ground 16 could be defined by the substrate on which the integrated circuit is formed, the anode 15 of the diode 13 being constituted by the substrate or the portion thereof, its cathode 14 being formed in the substrate.

The charging current pulse passing stage in the illustrated embodiment is formed by four NPN transistors 17–20 arranged in a Darlington configuration. The respective collectors 21–24 of the Darlington configured transistors 17–20 are each connected to a bus 25 which is connected to the A.C. input terminal 10. The input terminal 11 is connected to the negative terminal of the battery 12. The respective emitters 25–28 of the Darlington connected transistors 17–20 are connected to the point of reference ground 16 respectively by resistors 29–32. In some cases, the resistor 32 need not be present, the emitter 28 of the transistor 20 being directly connected to reference ground 16. The emitter 25 of the first transistor 17 is connected to the base 33 of the transistor 18, its emitter 26 being connected directly to the base 34 of the transistor 19. The emitter 27 of the transistor 19, in turn, is connected to the base 35 of the transistor 20. The Darlington configured transistor amplifier constituted by the transistors 17–20 has a very high current gain β of about 200,000 can be easily achieved.

The Darlington configured amplifier constituted by the NPN transistors 17–20 is provided with a control stage, which includes a controlled amplifier constituted by a NPN transistor 36 having its emitter 37 connected directly to the point of reference ground 16, its collector 39 being directly conductively to the base 40 of the transistor 17. The base 40 of the transistor 17 and the collector 39 of the transistor 36 are directly conductivity connected to a source electrode 42 of a field-effect transistor (FET) 41, which has its drain electrode 43 directly conductively connected to the bus 25. A gate electrode 44 of the field effect transistor 41 is directly connected to the point of reference ground potential 16. The field effect transistor 41 has an operating characteristic such that it operates substantially linearly at low current levels and becomes saturated at high current levels, thus limiting maximum current supplied to the base 40 of transistor 17 and to the collector-emitter path of the controlled transistor 36. In an exemplary embodiment, the transistor 41 is designed so that it saturates when the line voltage reaches a level of about 30 volts greater than the voltage across the battery 12.

A resistor 45 is connected between the base 38 of the transistor 36 and its emitter 37 which is as indicated above, also directly conductively connected to the point of reference ground 16. The base 38 of the controlled transistor 36 is also connected to a control signal input terminal 46, which may be utilized to turn the transistors 17–20 off and to hold them off when an appropriate control potential is applied thereto. A Zener diode 47 is provided, its anode 48 being connected to the base 38 of the transistor 36. A cathode 49 of the Zener diode 47 is connected conductively to an emitter 51 of a NPN transistor 50 which has its collector 52 and its base 53 connected by a series connection of a resistor 54 and a resistor 55. The ends of the resistors 54 and 55 which are conductively connected together and conductively connected to an emitter 56 of a NPN transistor 57, its collector 58 being conductively connected to the bus 25. The base 59 of the transistor 57 is connected to the point of reference ground 16 by a series connection of a plurality of Zener diodes 60–64, these diodes being poled in the same direction, the cathode of the one Zener diode 60 being conductively connected to the base 59.

The base 59 of the transistor 57 is also conductively connected to the source electrode 65 of a second field effect transistor (FET) 66 which has its drain electrode 67 conductively connected to the bus 25, its gate electrode 68 being directly conductively connected to the point of reference ground 16. The field effect transistor 66 has an operating characteristic such that it operates substantially linearly at low current levels and becomes saturated at high current levels, thus limiting maximum current supplied to the base 59 of the transistor 57. The field effect transistor, in an exemplary embodiment, is designed to saturate when the line voltage on the bus 25 reaches about 30 volts greater than the voltage across the battery 12. The Zener diodes 60–64 limit the maximum voltage applied to the base 57.

The base 53 of the transistor 50 which is connected to one end of the resistor 55 is also connected to the point of reference ground 16 by a series connection of a variable resistor 69, a resistor 70 and a resistor 71, the variable resistor 69 being provided to set the turn-off point of the circuit. The resistor 71 is connected between the base 72 and the emitter 73 of a NPN transistor 74, its collector 75 being coupled to one end of the resistor 70. The other end of the resistor 70 which is connected to the other end of the resistor 71 is also connected to the base 72 of the transistor 74. The emitter 73 of the transistor 74 is directly conductively connected to the point of ground reference 16. The transistor 74 functions as a temperature stabilizing element, this transistor being suitably positioned so that it operates at substantially the same temperature as the transistors 17–20.

Figure 2:
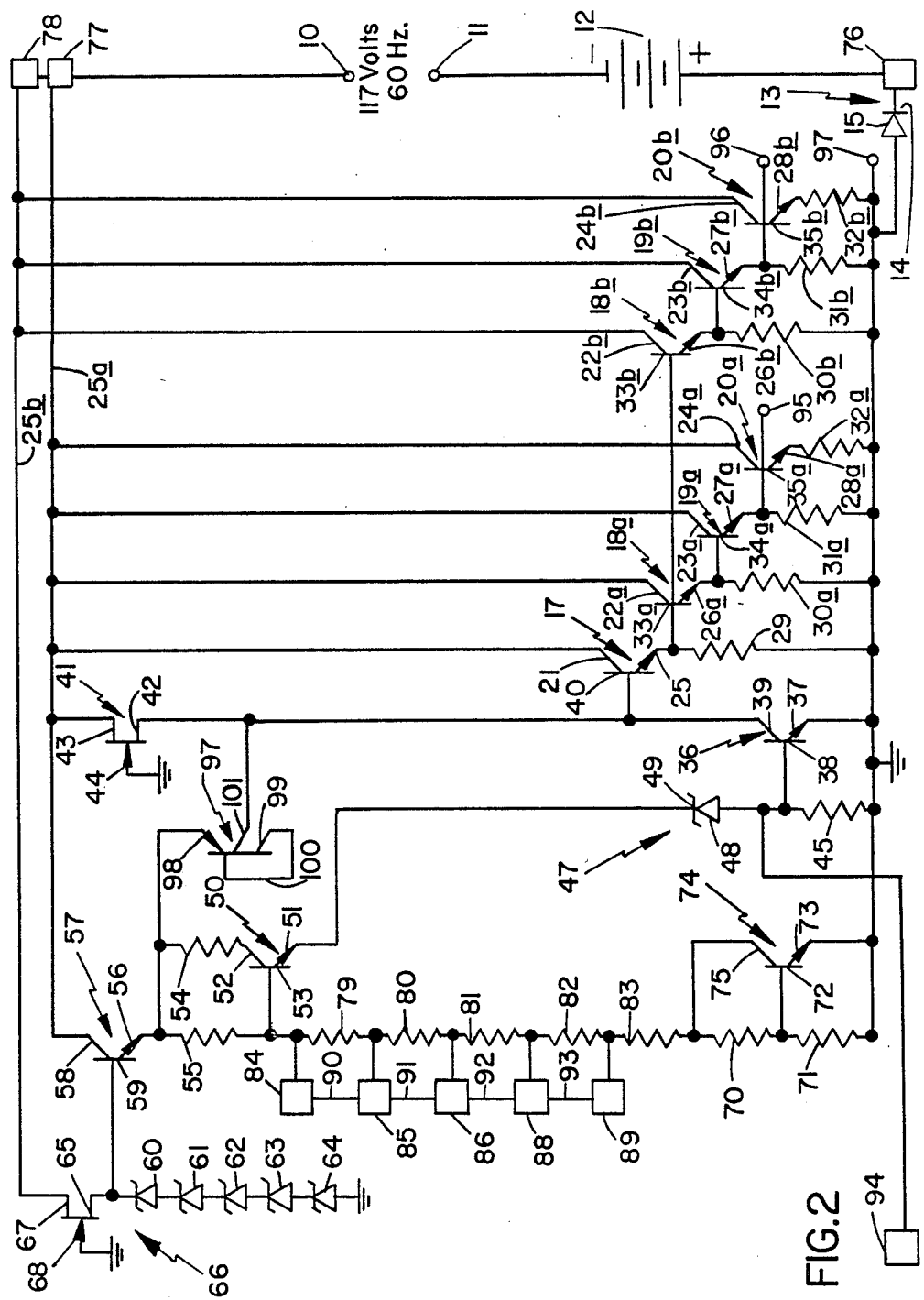
FIG. 2 is a schematic circuit diagram of a variant of the embodiment of the current producing circuit according to the present invention shown in FIG. 1 which is especially adapted to realization as a monolithic semiconductive structure which includes a substrate also serving as an electrode of a diode rectifier.

A preferred variant of the embodiment of the current pulse producing current illustrated in FIG. 1 is shown in FIG. 2, the variant being particularly adapted for construction as an integrated circuit and in particular a monolithic integrated circuit. The circuit shown FIG. 2 is very similar to that shown in FIG. 1, similar circuit components being designated by identical reference numerals in both FIG. 1 and FIG. 2. Only a few circuit differencs are present. Firstly, the variable resistor 69 has been replaced by a plurality of resistors 79–83 in a series connection. A plurality of conductive pads 84–89 are respective conductively connected to the respective connection point between the resistors 55 and 79, the resistors 79 and 80, the resistors 80 and 81, the resistors 81 and 82, and the resistors 82 and 83. The conductive pads 84–89, as illustrated, are each conductively connected to the adjacent pad or pads by respective conductive connections 90–93. The purpose of the pads 84–89 and the connections therebetween and the connection points between adjacent ones of the resistors 79–82 allows one making final circuit adjustment steps to selectively place any one, any number, or all of the resistors 79–82 in circuit. Thus, it is possible to adjust the turn-off point of the circuit during manufacturing.

In the integrated version of the current producing circuit of FIG. 2, a conductive pad 94 is conductively connected to the base 38 of the transistor 36, this pad serving the same function as the terminal 46 of the circuit illustrated in FIG. 1.

In place of the Darlington configured transistors 18–20 of the circuit as illustrated in FIG. 1, the circuit of FIG. 2 has been modified so that these transistors are replaced by six transistors 18a–20b and 18b–20b. The first transistor 17 of the Darlington configured transistors is operatively arranged to drive both the transistor 18a and the transistor 18b via their respective bases 33a and 33b. The respective emitters 26a–28a and 26b–28b of the transistors 18a–20a and 18b–20b are respectivly connected to the point of reference ground 16 respectively via resistors 30a–32a and 30b–32b. The emitter 26a of the transistor 18a is conductively connected to the base 34a of the transistor 19a, its emitter 27a being in turn conductively connected to the base 35a of the transistor 20a. Similarly the emitter 26b of the transistor 18b is conductively connected to the base 34b of the transistor 19b, its emitter 27b being conductively connected to the base 35b of the transistor 20b. Three test points 95–97 are desirably provided, these being conductively connected respectivly to the base 35a of the transistor 20a, the base 35b of the transistor 20b and to the point of reference ground 16, which as pointed out above is realized by the substrate upon which the integrated circuit is formed. The collectors 22b–24b are conductively connected to a bus 25b, while the collectors 22a–24a are conductively connected to a bus 25a, the buses 25a and 25b replacing the bus 25 of the circuit illustrated in FIG. 1. The collector 58 of the transistor 57 and the source electrode 43 of the field effect transistor 41 are also conductively connected to the bus 25a. The source electrode 67 of the field-effect transistor 66 is directly connected to the conductive bus 25b.

The buses 25a and 25b are respectively conductively connected to conductive pads 77 and 78, both of which are connected to the terminal 10 of the A.C. power source. A further conductive pad 76 is provided to allow one to readily connect the positive terminal battery 12 to the cathode 14 of the rectifying diode 13, the conductive pad 76 being provided in a conductive circuit between these two circuit components.

Because the substrate, which defines the point of reference ground and is also used as the anode 15 of the rectifying diode 13 when the circuit of FIG. 2 is realized as a monolithic, single-crystal integrated circuit, serious parasitic transistor action is present because the anode 15 of the diode 13 and its cathode 14 respectively act as the base and emitter of a parasitic NPN transistor structure having a plurality of collectors, in particular a collector defined by an epitaxial tank which also defines the collector 39 of the transistor 36. The parasitic transistor action causes undesired current to flow out of several respective current points, in particular the circuit point defined by the base 40 connection to the transistor 17, and undesirably affect the operation of the transistor 17, as well as other active circuit components, because of the collection of the undesired carriers by the epitank which also is utilized as the collector 39 of the transistor 36, which is connected to the base 40 of the transistor 17. The problem is especially great in the present case, even in instances where the parasitic transistor has relativity low current gain, because of the high current which flows in the base-emitter circuit (diode 13) of the parasitic transistor, which invoives the collector 39 as its collector, this current being the high amplitude current pulses which pass through the diode 13.

In order to overcome the instability and problems associated with the undesired current caused by parasitic transistor action on the function of the active circuit components, especially the transistor 17, a PNP transistor 97 is provided. The emitter 98 of the PNP transistor 97 is conductively connected to the emitter 56 of the transistor 57, a first collector 99 of the transistor 97 being conductively connected to its base 100. A second collector 101 of the transistor 97 is conductively connected to the collector 39 of the transistor 36 and the base 40 of the transistor 17, the circuit point at which the undesired current produced by the parasitic transistor action flows. The base 100 of the transistor 97 is so dimensioned, with respect to the component functioning as the collector zone of the parasitic transistor (the zone also constituting the collector zone of the transistor 36) and spaced from the diode 13 so that the transistor 97 produces a current at the above-mentioned circuit point which is substantially equal to and of opposite direction with respect to the undesired current thereat resulting from the parasitic transistor action. The mirror current produced by the transistor 97 being substantially equal in magnitude and of opposite direction with respect to the undesired current produced by the NPN parasitic transistor action, negates or cancels the undesired current. As a result, the circuit of FIG. 2 realized as a monolithic, single-crystal current pulse producing circuit is stable and operates in its intended fashion.

All active and passive circuit components and the conductive connections therebetween may be made using well known fabrication techniques.

Figure 6:
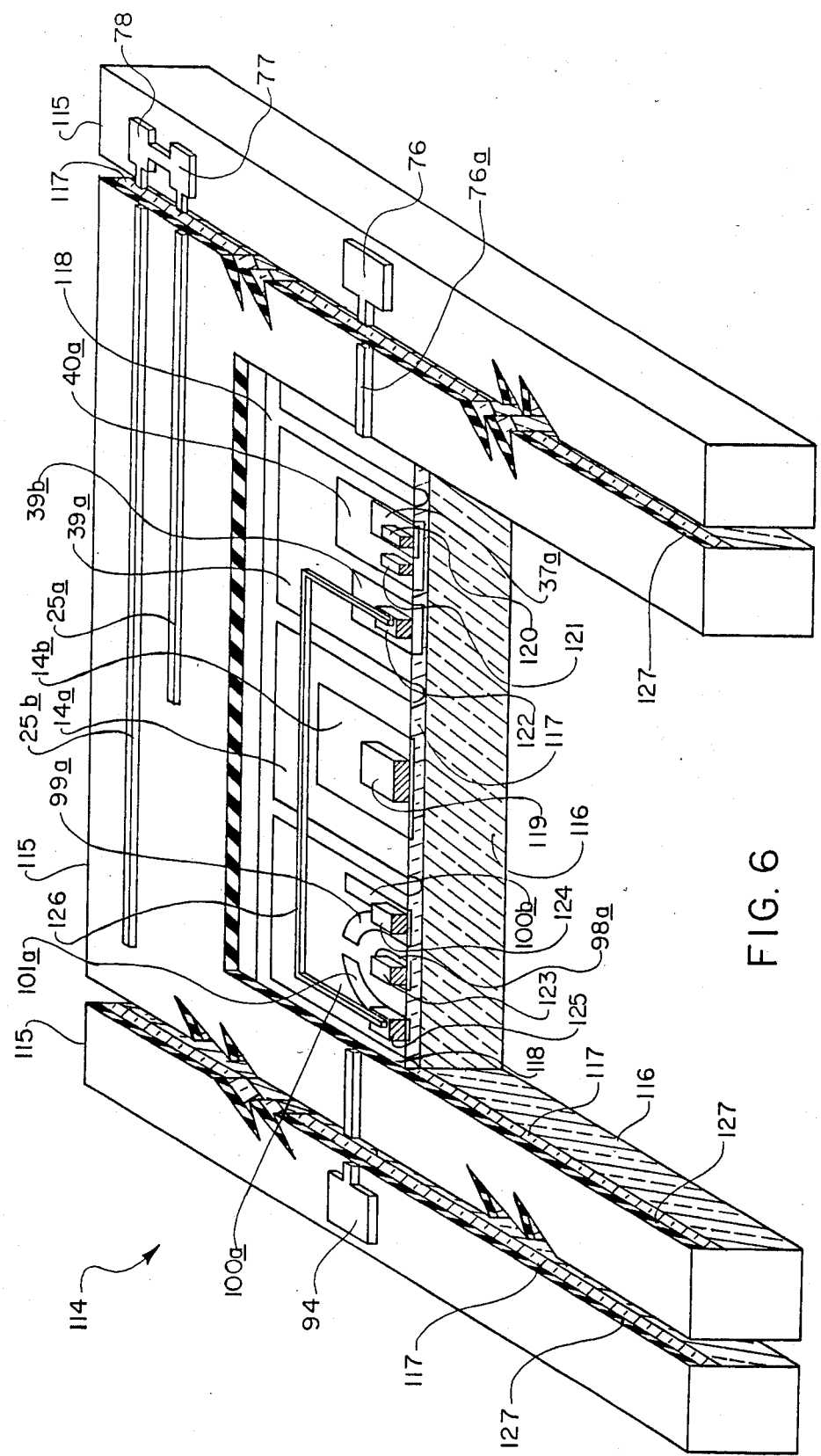
FIG. 6 is a diagramatic, simplified, pictorial view of an integrated circuit incorporating the present invention, part of the circuit being broken away to expose its internal construction and show the relative positions of the rectifying diode and related components.

Referring to FIG. 6, a simplified, pictorical view, partially in section, of an illustrated preferred embodiment of a solid state circuit incorporation the present invention is designated generally by the reference numberal 114 which is formed, using well known conventinal frabrication techniques in and on a semiconductor chip 115, portions of which have been broken away for the purpose of showing physical details of the diode 15 (FIG. 2), the transistor 35 (FIG. 2), the collector 39 of which also acts as the collector of the parasitic transistor, and the transistor 97, (FIG. 2) and their relationship to each other. The diode 13 and the transistor 36 and 97 are shown bisected in cross section.

The chip 115 includes a P-type substrate 116. A N-epitaxial layer 117 is grown over the substrate 116. A number of linearly extending, intersecting P-type isolation zones 118, produced by conventional diffusion techniques, extend through the N-layer 117 providing for isolation between circuit components, as is well known. Similar P-type zones (not visible in FIG. 6) provide isolation among the circuit components and groups thereof.

As visible in FIG. 6, the diode 13 (FIG. 2) has its cathode 14 defined by the portion of the N-layer 117 designated 14a in which a N+ zone 14b is formed, the zone 14b providing a means to effect a good ohmic connection to an aluminum contact 119. The aluminum contact 119 is conductively connected by a bus 76a to the pad 76, portions of the bus 76a being broken out for the purpose of clarity.

The NPN transistor 36 (FIG. 2) as visible in FIG. 6 is constituted by a P-type base zone 40a formed in a portion of the surface of the epitaxial layer 117 which defines a N-type collector zone 39a, in which an N+ zone 39b is formed to provide a good ohmic contact thereto. A N-type emitter zone 37a is formed in the P-type material forming the base zone 40a. A collector is constituted by the zone 39a portion of the N-type epitaxial layer 117 and an N+ zone 39b formed in a part of the zone 39a of the epitaxical layer 117. Conductive connections to the emitter, base and collector are respectively provided by respective aluminum contacts 120, 121 and 122 which, with conductive extentions thereof, conductively connect these transistor zones to other circuit points, not visible in FIG. 6, but illustrated in FIG. 2.

The PNP transistor 97 (FIG. 2) as visible in FIG. 6 is constituted by a N-type base zone 100a defined by a portion of the epitaxial layer 117 and a N+ zone 100b formed in a portion thereof. The emitter is defined by a P+ zone 98a formed in a portion of the surface of the epitaxial layer 117. The first collector is constituted by a P+ zone 99a formed in a portion of the surface of the epitaxial layer 117 in close proximity to the N+ base zone 100b, those two zones are conductively connected by an aluminum contact 124 which is positioned over and contacts the zones 99a and 100b. The second collector is constitued a P+ zone 101a formed in a portion of the surface of the epitaxial layer 117. The zones 101a and 99a are of substantially identical shape and size and are positioned substantially at equal distances from the emitter zone 98a. An aluminum contact 125 is provided to effect communication with the zone 101a. As illustrated, the contact 125 is conductively connected, via a bus 126, to the contact 122 to the collector 39b to provide a path for the second mirror current to the circuit point between the collector 39 (FIG. 2) and the base 40 (FIG. 2) to negate or cancel the undesired current which would otherwise be present at that point as a result of the parasitic transistor action.

It is to be noted that the base zone 100a corresponds in shape and in area to the collector zone 39a (which also acts as a collector of the parasitic transistor) and that these zones are positioned at substantially equal distances from the rectifying diode defined by the zones 14a, 14b and that portion of the epitaxial layer 117 which acts as the anode of the diode and also defines the base of the parasitic transistor.

The zones 39a and 100a are substantially identical epitanks. Thus, each can be considered to collect or receive a substantially equal number of carriers resulting from parasitic action. The PNP transistor 97 (FIG. 2), as realized by the structure shown in FIG. 6, functions as an amplifier having a gain of one, thus it can be considered to produce a mirror current from its second collector 101a which, when algebraically added to the undesired current produced by the parasitic transistor action involving the zone 39a as a collector negates same.

For the sake of clarity, an insulating layer, formed by oxide growth of $SiO_2$ on the surface of the chip 115 has been removed to expose portions of the diode and the two transistors to view. The insulating layer, is visible, in cross section as layer 127 over which the bus 126 extends. The contacts 119-125, as well as other contacts not visible in FIG. 6, are formed, in conventional fashion, after first providing windows in the $SiO_2$ layer at appropriate predetermined areas. These contacts, and other contacts as well as the bus 126, the buses 25a and 25b, the pads 76-78 and 94 and other conducting members may be formed conventionally by evaporating or sputtering aluminum metal on the surface of the chip 115 and through the windows in the $SiO_2$ layer and thereafter etching portions away to define the buses and pads. The same techniques provide conductive connections from the contacts 120-124 to connect these to other circuit points, not visible in FIG. 6, but illustrated schematically in FIG. 2.

Turning briefly to FIGS. 7 and 8, the integrated circuit of the present invention, indicated generally by the numeral 128 may be potted within an epoxy material constituting a housing 129 and is fixed to a heat sink 130 made of a suitable heat conductor. A circular aperture 131 extends through portion of the heat sink 130 to allow the structure to be mounted. The circuit 128, as shown in FIG. 7, is spaced from the heat sink by a flat electrical insulating sheet 132. As shown in FIG. 8, the circuit 128 is directly mounted on the heat sink 130. Thin conductive wires 133-135 respectively extend from the pads 77, 78 and 76 and 94, not shown in FIG. 4, but shown in FIG. 2 to conductive connectors 136-138 respectively which extend out from the housing 129 providing electrical communication with the circuit 128.

Figure 4:
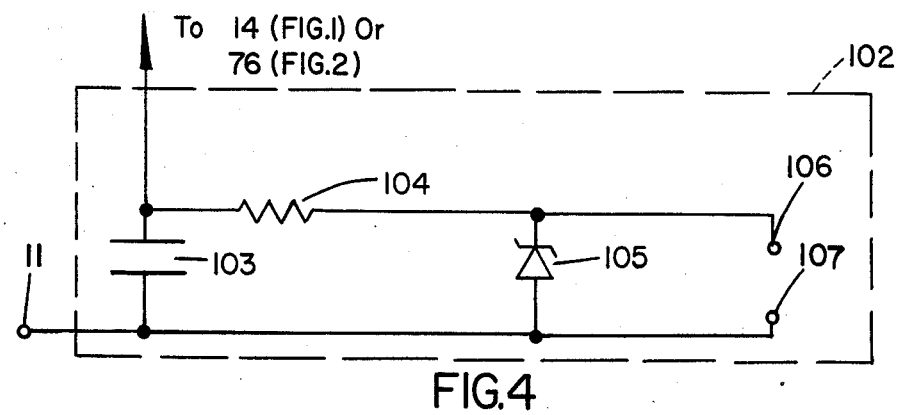
FIG. 4 is a schematic diagram of an exemplary smoothing circuit which may be associated with the current pulse producing circuits of FIGS. 1 and 2, as a replacement for a battery to be recharged, in the event the circuits are to be used as part of a D.C. power supply of general application instead of as a battery charger.

As shown in FIG. 4, an illustrative, first embodiment of a smoothing circuit 102 which may be substituted for the battery 12 (FIGS. 1, 2), in the event one wishes to use the current pulse producing circuit as a part of a D.C. power supply, includes 1000 μf storage capacitor 103 realized as an electolytic capcitor having an electrode connected to the terminal 11 of the 117 volt, 60 Hz. source. A 56 ohm resistor 104 and a Zener diode 105 are connected in series across the storage capacitor 103, output terminals 106, 107 of the power supply being connected across the Zener diode 105 can be realized, for example, as a 9.1 volt diode designated by the numeral ECG 5018A. The capacitor 103 of the smoothing circuit 102 thus has one of its plates connected to the terminal 11, its other plate being connected to the cathode 14 of the diode 13, placing the storage capacitor 24 in circuit so that it can receive current pulses from the current regulating pulse producing circuits. The current regulating circuit of FIGS. 1 and 2, in each case, operates to supply current pulses to charge the capacitor 103. It is to be appreciated that the circuits illustrated in FIGS. 1 and 2 can be utilized to charge capacitors of considerably different sizes and voltage levels from sources of different levels and/or supply frequencies, the conventional 117 volt, 60 Hz. frequency being set out by way of example only.

Figure 5:
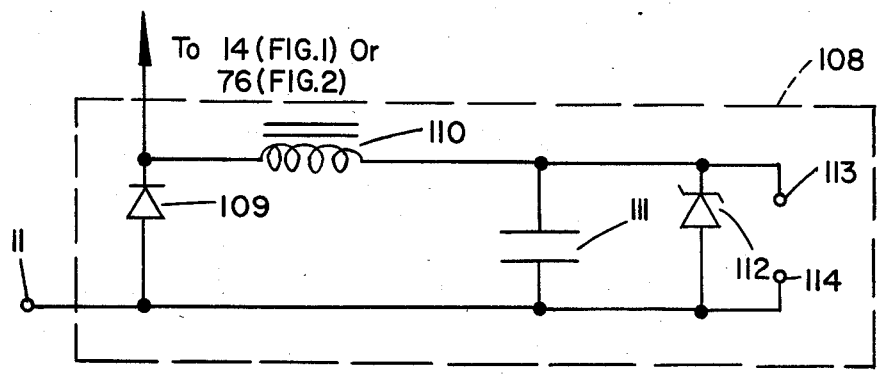
FIG. 5 is a schematic diagram of another exemplary smoothing circuit which may be associated with the current pulse producing circuits of FIGS. 1 and 2, as a replacement for a battery to be recharged, in the event the circuits are to be used as part of a D.C. power supply.

As illustrated in FIG. 5, a passive smoothing circuit 108, which may be substituted for the smoothing circuit 102 (FIG. 4), includes a flyback diode 109 having its anode connected to one terminal 11 of the A.C. source, its cathode being connected to one end of an inductor 110. The other end of the inductor 110 is connected to one plate of a storage capacitor 111 which has its other plate connected to the anode of the flyback diode 109 and the terminal 11. The Zener diode 112 is connected across the capacitor 111, the Zener diode being poled in the same fashion as the flyback diode 109. A pair of output terminals 113, 114 are connected across the capacitor 111. The cathode of the diode 109 is, when the smoothing circuit 108 replaces the battery 12 (FIGS. 1, 2), connected to the cathode of the rectifying diode 13.

Figure 3A:
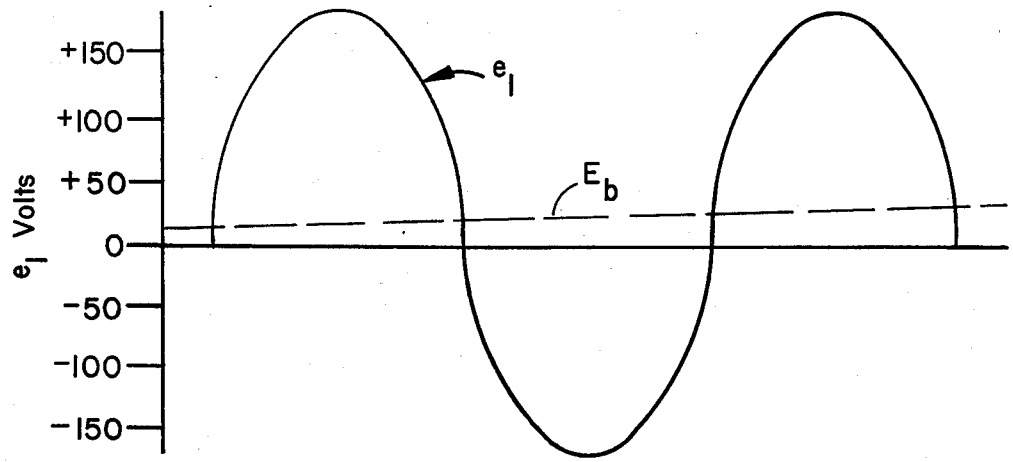
FIGS. 3A–3C are voltage and current wave forms at various locations in the circuits illustrated in FIGS. 1 and 2 helpful in understanding the operation thereof.
Figure 3B:
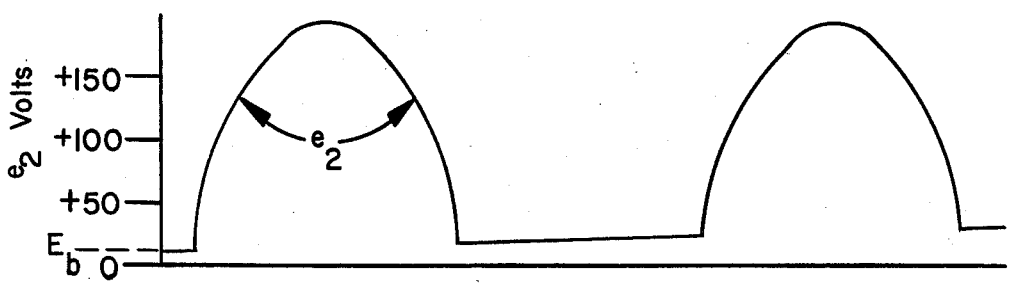
Figure 3C:
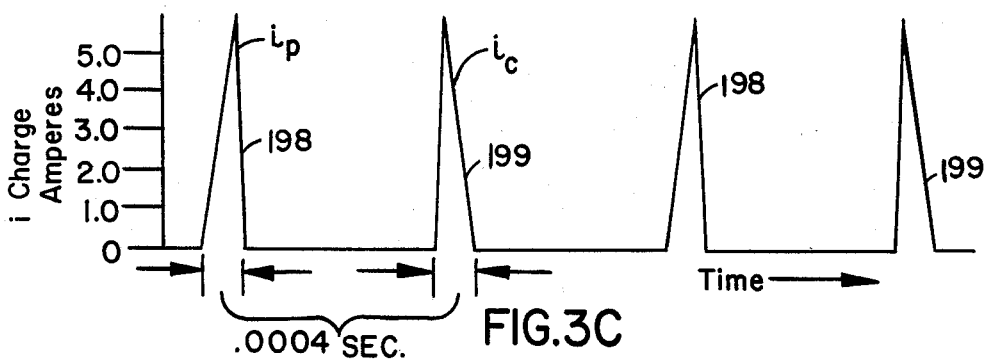

In operation, the circuit arrangements shown in FIGS. 1 and 2 are placed in operation by connecting the D.C. current pulse producing circuit in series with the battery to be recharged across the 117 volt, 60 Hz.

voltage source which is shown as connected between the input terminals 10, 11. The battery 12 to be charged is connected between the terminal 11 and the cathode 14 of rectifying diode 13. FIG. 3A shows the waveform $e_1$ as a function of time of the input, A.C. source voltage for a conventional 117 volt (rms), 60 Hz. household outlet supply. FIG. 3B is a waveform $e_2$ of the voltage between bus 25 (FIG. 1) or the buses 25a, 25b (FIG. 2) and the point of reference potential 16. The voltage waveforms as shown in FIGS. 3A and 3B are illustrated for one and one-half cycles of the 60 Hz. input. FIG. 3C is a corresponding waveform of the charging current $i_c$, during operation. As can be seen in FIG. 3C, there are two current spikes 198, 199 for each cycle of A.C. input, the peak charging current $i_p$ being about 5.0 amperes. These current spikes 198, 199, as can be seen, are relatively short in duration, for example about 0.0004 seconds, resulting in an average charging current $i_a$ of about 0.12 ampere.

Referring again to FIGS. 1 and 2, the diode 13 provides a source of input current for the Darlington configured current amplifier defined by the transistors 17-20 (FIG. 1) or transistors 17, 18a-20a and 18b-20b (FIG. 2), as well as operating voltage for the controlled switching transistor 36 of the control stage. Thereafter, when the A.C. voltage $e_1$ of the source is positive and slightly greater; for example, less than about 2.6 volts greater than potential $E_b$ of the battery 12 which is to be recharged, the transistors 36 and 17-20 (FIG. 1) or 17, 18a-20a and 18b-20b (FIG. 2) do not conduct. When the voltage difference reaches about 2.6 volts, the field effect transistors 41 and 66 turn on, the voltage on the base 40 of the transistor 17 rises, turning it on, and battery charging current starts to flow through the transistors 17-20 (FIG. 1) or 17, 18a-20a and 18b-20b (FIG. 2), illustrated as the leading edge of the current spike 198 in FIG. 3C. The current into the base of the transistor 17 in effect is amplified by the Darlington configured transistors, and initially flows at a relatively low level, into the battery, thereby starting to charge the battery as the leading edge of the current spike 198 starts toward the 5.0 ampere level. This current, illustrated as current spike 198, increases as the voltage supplied via the rectifying diode 13 becomes more positive and reaches its peak of about 5.0 amperes when the line voltage $e_1$ is about 27.6 volts greater than the battery voltage $E_b$. The transistors 57 and 36 remain off. Increasing current is supplied not only to the Darlington connected transistors, but also to the base 59 of the transistor 57, via the field effect transistor 66 when the voltage at its source electrode 67 becomes sufficiently high. Once the current into the base of the transistor 57 is sufficient, when the line voltage $e_1$ reaches the level of about 27.6 volts greater than the battery voltage $E_b$ to turn this transistor on, considerble current starts to flow through the emitter-collector path thereof, raising the voltage on the base of the transistor 50 to a level at which it conducts. The Zener diode 47 then breaks down, control current flows in the resistor 45 and the voltage on the base of the controlled transistor 36 raises to a level which causes it to conduct. When current flows in the emitter-collector path of the transistor 36, the voltage on the base 40 of the transistor 17 falls, reducing the current supplied to the base of the transistor 17, causing the current amplifier, consisting of the transistors 17-20 (FIG. 1) or 17, 18a-20a and 18b-20b (FIG. 2) connected in Darlington configuration, to exhibit reduced current flow, as illustrated by the trailing edge of the current spike 198 in FIG. 3C and quickly turn off the resulting current spike 198 having a duration of about 0.0004 seconds. Thus, the Darlington connected transistors are quickly turned off when the line voltage $e_1$ reaches a difference of about 27.6 volts with respect to battery voltage $E_b$ and remain off substantially during the period that this voltage difference exceeds this level. The transistors 17-20 (FIG. 1) or 17, 18a-20a and 18b-20b (FIG. 2) are quickly turned on when the difference between the line voltage $e_1$ and the battery voltage $E_b$ again reaches, as the line voltage falls, about 27.6 volts with respect to the battery voltage $E_b$ while the transistor 36 is conducting, with the result of the leading edge of the current spike 199 of FIG. 3C is produced, this current spike reaching a peak of about 5.0 amperes when the voltage difference between the voltage $e_1$ and the battery voltage $E_b$ reaches slightly less than about 27.6 volts. The transistors 17-20 (FIG. 1) or 17, 18a-20a and 18b-20b (FIG. 2) remain conducting until the difference between the input voltage $e_1$ and the battery voltage $E_b$ again reaches about 2.6 volts. Thus, current spike 199 of about 5.0 amperes and 0.0004 second duration is produced. These actions take place every other half cycle of the input voltage $e_1$ with the result that the two current spikes 198, 199 are produced, one near the starting portion, and the other near the ending portion of each of these half cycles. Thus, a charging current spike 198 is produced for a short period of time; for example, of about 0.0004 seconds as indicated above during an initial portion of the rectified half-wave voltage output $e_2$ from the rectifying diode 13 and another current spike 199 during its terminal portion, the spike 199 also having a duration of about 0.0004 seconds as indicated above. These actions take place time and time again, providing, in effect, a charging current in the form of current spikes to the battery 12 which continue until one either removes the battery from the circuit or applies a turn off control voltage to the control terminal 46 (FIG. 1) or the pad 94 (FIG. 2). It is to be understood that the circuit can be operatively associated with a circuit or apparatus (not illustrated) which determines automatically when the battery 12 reaches substantially full charge and which develops a control signal which would be applied to the terminal 46 (FIG. 1) or the pad 94 (FIG. 2) to turn the pulse producing circuit off when the battery 12 becomes fully charged. The undesired current which would appear at the circuit point constituted by the conductive connection between the collector 39 of the transistor 36 and the base 40 of the transistor 17 is substantially negated by the mirror current produced at that point by the transistor 97.

In the cases where the battery 12 is replaced by the smoothing circuits illustrated in FIGS. 4 and 5, the capacitor 103 (FIG. 4) or the capacitor 111 (FIG. 5) is charged by the current pulses, illustrated as the spikes 198, 199 (FIG. 3C), the capacitor 111 receiving its charge via the inductor 110. In this case, it is to be appreciated that the circuits could be operatively associated with a voltage sensing circuit (not shown) responsive to the D.C. output at the terminals 106, 107 (FIG. 4) or the terminals 113, 114 (FIG. 5) which would develop a control signal indicative of the D.C. voltage being at a desired level, which control signal could be applied to the terminal 46 (FIG. 1) or the pad 94 (FIG. 2) to turn the pulse producing circuit on and off as needed to maintain the D.C. output level, thereby providing voltage regulation. When associated with such a voltage regulating circuit, the Zener diode 105 (FIG. 4) or the Zener diode 112 (FIG. 5) need not be present.

It is to be understood that the foregoing description and accompanying drawings relate to embodiments which have been set out by way of example, not by way of limitation. Numerous other embodiments and variants of the battery charging circuits and power supply circuits are possible, without departing from the spirit and scope of the present invention, its scope being defined by the appended claims. We claim:

1. In a direct current pulse producing circuit including means for connection to at least one energy storing component of a D.C. power supply, means for connection to an electrical power source, an electrical charging circuit coupling said input means to said means for connection to at least one energy storing component of a D.C. power supply for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and being solely responsive to the instantaneous level of the unfiltered rectified D.C. voltage and voltage across the storing component for controlling said charging current carrying means to allow conduction thereof only during periods when the instantaneous level of the unfiltered D.C. voltage is substantially between a first level greater than the voltage across the storing component and a second higher level which exceeds the first level by substantially a given amount and to prevent conduction during periods when the instantaneous level of the unfiltered D.C. voltage exceeds the second level, and wherein said controlling circuit means includes a variable resistive network operatively arranged to set the voltage level at which the charging current carrying means are turned off.

2. The direct current pulse producing circuit according to claim 1, wherein said variable resistive network is constituted by a plurality of resistors connected in series and formed as part of an integrated circuit and conductive means extending between said resistors to short each out, said conductive means being accessible during manufacture, so that one or more of said resistors can be placed in circuit to set the voltage level at which the charging current means are turned off.

3. In a direct current pulse producing circuit including means for connection to at least one energy storing component of a D.C. power supply, means for connection to an electrical power source, an electrical charging circuit coupling said input means to said means for connection to at least one energy storing component of a D.C. power supply for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and being solely responsive to the instantaneous level of the unfiltered rectified D.C. voltage and voltage across the storing component for controlling said charging current carrying means to allow conduction thereof only during periods when the instantaneous level of the unfiltered D.C. voltage is substantially between a first level greater than the voltage across the storing component and a second higher level which exceeds the first level by substantially a given amount and to prevent conduction during periods when the instantaneous level of the unfiltered D.C. voltage exceeds the second level, and including at least one field effect transistor coupled between one side of the electrical power source and said controlling circuit means to limit controlling circuit current to a low level.

4. In a direct current pulse producing circuit including means for connection to at least one energy storing component of a D.C. power supply, means for connection to an electrical power source, an electrical charging circuit coupling said input means to said means for connection to at least one energy storing component of a D.C. power supply for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and being solely responsive to the instantaneous level of the unfiltered rectified D.C. voltage and voltage across the storing component for controlling said charging current carrying means to allow conduction thereof only during periods when the instantaneous level of the unfiltered D.C. voltage is substantially between a first level greater than the voltage across the storing component and a second higher level which exceeds the first level by substantially a given amount and to prevent conduction during periods when the instantaneous level of the unfiltered D.C. voltage exceeds the second level, and wherein the direct current pulse producing circuit is at least partially in the form of an integrated circuit having active circuit components including at least one transistor and wherein at least one parasitic transistor action causes collection of carriers of one type by a circuit component functioning as a collector of a parasitic transistor and flow of undesired current at at least one circuit point as a result of the parasitic transistor action, and wherein the improvement further comprises means for producing at the at least one circuit point a second current of substantially equal magnitude and opposite direction with respect to the undesirable current caused by the parasitic transistor action to substantially negate the undesired current.

5. The direct current pulse producing circuit according to claim 4, wherein the integrated circuit includes a substrate and said rectifying means comprises a diode having at least one of its electrodes constituted by at least part of said substrate, said diode comprising a base-emitter path of the parasitic transistor.

6. The direct current pulse producing circuit according to claim 5, wherein said means for producing a second current comprises at least one transistor forming a portion of the integrated circuit.

7. The direct current pulse producing circuit according to claim 4, wherein said at least one transistor comprises a transistor having a base, an emitter and at least two collectors, one of said collectors being connected to said base, the other of the collectors being coupled to the circuit point at which the undesired current would flow so as to substantially negate the undesired current.

8. In a direct current pulse producing circuit including means for connection to at least one energy storing component of a D.C. power supply, means for connection to an electrical power source, an electrical charging circuit coupling said input means to said means for connection to at least one energy storing component of a D.C. power supply for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and being solely responsive to the instantaneous level of the unfiltered rectified D.C. voltage and voltage across the storing component for controlling said charging current carrying means to allow conduction thereof only during periods when the instantaneous level of the unfiltered D.C. voltage is substantially between a first level greater than the voltage across the storing component and a second higher level which exceeds the first level by substantially a given amount and to prevent conduction during periods when the instantaneous level of the unfiltered D.C. voltage exceeds the second level, and wherein said charging current carrying means is formed as part of an integrated circuit and is constituted by a plurality of transistors arranged in Darlington configuration, at least the final stage of the Darlington configuration being comprised of at least two transistors having their respective inputs and outputs connected in parallel.

9. The direct current pulse producing circuit according to claim 8, wherein the first stage of the Darlington configuration is comprised of a single transistor and each of the other stages of the Darlington configurations is comprised respectively of at least two respective transistors having their respective inputs and outputs connected in parallel.

10. In a battery charger including means for connection to at least one battery or cell, input means for connection to an electrical power source, an electrical charging circuit coupling said input means to said means for connection to at least one battery or cell for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and solely responsive to the instantaneous level of the unfiltered rectified D.C. voltage and battery or cell voltage for controlling said charging current carrying means to allow conduction thereof only during periods when the instantaneous level of the unfiltered D.C. voltage is substantially between a first level greater than the battery or cell voltage and a second higher level which exceeds the first level by substantially a given amount and to prevent conduction during periods when the instantaneous level of the unfiltered D.C. voltage exceeds the second level, and wherein said controlling circuit means includes a variable resistive network operatively arranged to set the voltage level at which the charging current carrying means are turned off.

11. The battery charger according to claim 10, wherein said variable resistive network is constituted by a plurality of resistors connected in series and formed as part of an integrated circuit and conductive means extending between said resistors to short each out, said conductive means being accessible during manufacture so that one or more of said resistors can be placed in circuit to set the voltage level at which the charging current means are turned off.

12. In a battery charger including means for connection to at least one battery or cell, input means for connection to an electrical power source, an electrical charging circuit coupling said input means to said means for connection to at least one battery or cell for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and solely responsive to the instantaneous level of the unfiltered rectified D.C. voltage and battery or cell voltage for controlling said charging current carrying means to allow conduction thereof only during periods when the instantaneous level of the unfiltered D.C. voltage is substantially between a first level greater than the battery or cell voltage and a second higher level which exceeds the first level by substantially a given amount and to prevent conduction during periods when the instantaneous level of the unfiltered D.C. voltage exceeds the second level, and including at least one field effect transistor coupled between one side of the electrical power source and said controlling circuit means to limit controlling circuit current to a low level.

13. In a battery charger including means for connection to at least one battery or cell, input means for connection to an electrical power source, an electrical charging circuit coupling said input means to said means for connection to at least one battery or cell for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and solely responsive to the instantaneous level of the unfiltered rectified D.C. voltage and battery or cell voltage for controlling said charging current carrying means to allow conduction thereof only during periods when the instantaneous level of the unfiltered D.C. voltage is substantially between a first level greater than the battery or cell voltage and a second higher level which exceeds the first level by substantially a given amount and to prevent conduction during periods when the instantaneous level of the unfiltered D.C. voltage exceeds the second level, and wherein the electrical charging circuit is at least partially in the form of an integrated circuit having active circuit components including at least one transistor and wherein at least one parasitic transistor action causes collection of carriers of one type by a circuit component functioning as a collector of a parasitic transistor and flow of undesired current at at least one circuit point as a result of the parasitic transistor action, the improvement further comprising means for producing a second current at the at least one circuit point a second current of substantially equal magnitude and opposite direction with respect to the undesired current caused by the parasitic transistor action to substantially negate the undesired current.

14. The battery charger according to claim 13, wherein the integrated circuit includes a substrate and said rectifying means comprises a diode having at least one of its electrodes constituted by at least part of said substrate, said diode comprising a base-emitter path of the parasitic transistor.

15. The battery charger according to claim 14, wherein said means for producing a second current comprises at least one transistor forming a portion of the integrated circuit.

16. The battery charger according to claim 14, wherein said at least one transistor comprises a transistor having a base, an emitter, and at least two collectors, one of said collectors being connected to said base, the other of the collectors being coupled to the circuit point of the integrated circuit at which the undesired current would flow so as to substantially negate the undesired current.

17. In a battery charger including means for connection to at least one battery or cell, input means for connection to an electrical power source, an electrical charging circuit coupling said input means to said means for connection to at least one battery or cell for supplying D.C. charging current pulses thereto and rectifying means for producing unfiltered rectified D.C. voltage, an improvement wherein said charging circuit comprises controlling circuit means and charging current carrying means coupled to receive output from said rectifying means, said charging current carrying means being coupled to said controlling circuit means and responsive to its output, said controlling circuit means being free of feedback from said charging current carrying means and solely responsive to the instantaneous level of the unfiltered rectified D.C. voltage and battery or cell voltage for controlling said charging current carrying means to allow conduction thereof only during periods when the instantaneous level of the unfiltered D.C. voltage is substantially between a first level greater than the battery or cell voltage and a second higher level which exceeds the first level by substantially a given amount and to prevent conduction during periods when the instantaneous level of the unfiltered D.C. voltage exceeds the second level, and wherein said charging current carrying means is formed as part of an integrated circuit and is constituted by a plurality of transistors arranged in Darlington configuration, at least the final stage of the Darlington configuration being comprised of at least two transistors having their respective inputs and outputs connected in parallel.

18. The battery charger according to claim 17, wherein the first stage of the Darlington configuration is comprised of a single transistor and each of the other stages of the Darlington configuration is comprised respectively of at least two respective transistors having their respective inputs and outputs connected in parallel.

19. A direct current pulse producing circuit comprising, in combination: output means for delivering direct current pulses to a utilization circuit; means for connection to an A.C. power source; rectifying means for providing an unfiltered, rectified D.C. voltage; and controlling circuit means and current pulse carrying means each coupled to receive output from said rectifying means, said current pulse carrying means being coupled to said controlling circuit means and responsive to its output, said controlling circuit means being free of feedback from said current pulse carrying means and solely responsive to the instantaneous level of the unfiltered rectified D.C. voltage and voltage across the output means for controlling said current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level, and wherein said controlling circuit means includes a variable resistive network operatively arranged to set the voltage level at which the current pulse carrying means are turned off.

20. The direct current pulse producing circuit according to claim 19, wherein said variable resistive network is constituted by a plurality of resistors connected in series and formed as part of an integrated circuit and conductive means extending between said resistors to short each out, said conductive means being accessible during manufacture, so that one or more of said resistors can be placed in circuit to set the voltage level at which the charging current means are turned off.

21. A direct current pulse producing circuit comprising, in combination: output means for delivering direct current pulses to a utilization circuit; means for connection to an A.C. power source; rectifying means for providing an unfiltered, rectified D.C. voltage; and controlling circuit means and current pulse carrying means each coupled to receive output from said rectifying means, said current pulse carrying means being coupled to said controlling circuit means and responsive to its output, said controlling circuit means being free of feedback from said current pulse carrying means and solely responsive to the instantaneous level of the unfiltered rectified D.C. voltage and voltage across the output means for controlling said current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level, and including at least one field effect transistor coupled between one side of the A.C. power source and said controlling circuit means to limit controlling circuit current to a low level.

22. A direct current pulse producing circuit comprising, in combination: output means for delivering direct current pulses to a utilization circuit; means for connection to an A.C. power source; rectifying means for providing an unfiltered, rectified D.C. voltage; and controlling circuit means and current pulse carrying means each coupled to receive output from said rectifying means, said current pulse carrying means being coupled to said controlling circuit means and responsive to its output, said controlling circuit means being free of feedback from said current pulse carrying means and solely responsive to the instantaneous level of the unfiltered rectified D.C. voltage and voltage across the output means for controlling said current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level, and wherein the direct current pulse producing circuit at least in part is in the form of an integrated circuit having active circuit components including at least one transistor and wherein at least one parasitic transistor action causes collection of carriers of one type by a circuit component functioning as a collector of a parasitic transistor and flow of undesired current at at least one circuit point as a result of the parasitic transistor action, the improvement further comprising means for producing at the at least one circuit point a second current of substantially equal magnitude and opposite direction with respect to the undesirable current caused by the parasitic transistor action to substantially negate the undesired current.

23. The direct current pulse producing circuit according to claim 22, wherein the integrated circuit includes a substrate and said rectifying means comprises a diode having at least one of its electrodes constituted by at least part of said substrate, said diode comprising a base-emitter path of the parasitic transistor.

24. The direct current pulse producing circuit according to claim 23, wherein said means for producing a second current comprises at least one transistor forming a portion of the integrated circuit.

25. The direct current pulse producing circuit according to claim 22, wherein said at least one transistor comprises a transistor having a base, an emitter and at least two collectors, one of said collectors being connected to said base, the other of the collectors being coupled to the circuit point at which the undesired current would flow so as to substantially negate the undesired current.

26. A direct current pulse producing circuit comprising, in combination: output means for delivering direct current pulses to a utilization circuit; means for connection to an A.C. power source; rectifying means for providing an unfiltered, rectified D.C. voltage; controlling circuit means and current pulse carrying means each coupled to receive output from said rectifying means; and current limiting means coupled between said means for connection to an A.C. power source and control inputs of said controlling circuit means and said current pulse carrying means for limiting current to control inputs thereof, said current pulse carrying means being coupled to said controlling circuit means and responsive to its output, said controlling circuit means being responsive to the instantaneous level of the unfiltered rectified D.C. voltage and voltage across the output means for controlling said current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level, and wherein at least said controlling circuit means and said current pulse carrying means are parts of an integrated circuit.

27. A direct current pulse producing circuit comprising, in combination: output means for delivering direct current pulses to a utilization circuit; means for connection to an A.C. power source; rectifying means for providing an unfiltered, rectified D.C. voltage; controlling circuit means and current pulse carrying means each coupled to receive output from said rectifying means; and current limiting means coupled between said means for connection to an A.C. power source and control inputs of said controlling circuit means and said current pulse carrying means for limiting current to control inputs thereof, said current pulse carrying means being coupled to said controlling circuit means and responsive to its output, said controlling circuit means being responsive to the instantaneous level of the unfiltered rectified D.C. voltage and voltage across the output means for controlling said current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level, and wherein at least said controlling circuit means; said current pulse carrying means and said rectifying means are parts of an integrated circuit.

28. A direct current pulse producing integrated circuit having at least one parasitic transistor action which results in flow of undesired current at at least one circuit point comprising, in combination: output means for delivering direct current pulses to a utilization circuit; means for connection to an A.C. power source; rectifying means for providing an unfiltered, rectified D.C. voltage; means for producing at the at least one circuit point a second current of substantially equal magnitude and opposite direction with respect to the undesired current to substantially negate the undesired current caused by the parasitic transistor action; and controlling circuit means and current pulse carrying means each coupled to receive output from said rectifying means, said current pulse carrying means being coupled to said controlling circuit means and responsive to its output, said controlling circuit means being responsive to the instantaneous level of the unfiltered rectified D.C. voltage and voltage across the output means for controlling said current pulse carrying means to allow conduction thereof only during periods when the instantaneous level of the unfiltered D.C. voltage is substantially between a first level greater than the voltage across the output means and a second higher level which exceeds the first level by substantially a given amount and to prevent conduction during periods when the instantaneous level of the unfiltered D.C. voltage exceeds the second level.

29. A direct current pulse producing circuit according to claim 28, wherein the integrated circuit includes a substrate and wherein said rectifying means comprises at least one diode, one electrode of said diode being constituted by at least one part of said substrate, its other electrode being formed in said substrate, and wherein said one and said other electrode constitute respectively a base and an emitter of at least one parasitic transistor which causes the undesired current at the at least one circuit point.

30. A direct current pulse producing circuit according to claim 28, wherein said means for producing the second current to substantially negate the undesired current caused by the parasitic effect comprises at least one transistor forming a portion of the integrated circuit.

31. In a direct current pulse producing circuit comprised at least in part by an integrated circuit wherein at least one parasitic transistor action results in flow of undesired current at at least one circuit point and means for producing a second current of substantially equal magnitude and opposite direction with respect to the undesired current at the one circuit point to substantially negate the undesired current.

32. The direct current pulse producing circuit according to claim 31, wherein the integrated circuit includes a plurality of circuit components, and wherein the at least one parasitic transistor action causes collection of carriers of one type by one of said circuit components acting as a collector of a parasitic transistor.

33. The direct current pulse producing circuit according to claim 32, wherein the integrated circuit includes a substrate and a zone associated therewith, said zone and at least a portion of said substrate constituting a diode, said diode forming a base and an emitter of the parasitic transistor.

34. A battery charger including a direct current pulse producing a circuit comprising, in combination: output means for delivering direct current charging pulses to a utilization circuit including at least one battery or cell; means for connection to an A.C. power source; rectifying means for providing an unfiltered, rectified D.C. voltage; controlling circuit means and current pulse carrying means each coupled to receive output from said rectifying means; and current limiting means coupled between said means for connection to an A.C power source and control inputs of said controlling circuit means and said current pulse carrying means for limiting current to control inputs thereof, said current pulse carrying means being coupled to said controlling circuit means and responsive to its output, said controlling circuit means being responsive to the instantaneous level of the unfiltered rectified D.C. voltage and voltage across the at least one battery or cell receiving charging pulses being delivered by the output means for controlling said current pulse carrying means to allow conduction thereof only during periods when the instantaneous level of the unfiltered D.C. voltage is substantially between a first level greater than the voltage across the at least one battery or cell receiving charging pulses being delivered by the output means and a second higher level which exceeds the first level by substantially a given amount and to prevent conduction during periods when the instantaneous level of the unfiltered D.C. voltage exceeds the second level, and wherein at least said controlling circuit means and said current pulse carrying means are parts of an integrated circuit.

35. A battery charger including a direct current pulse producing circuit comprising, in combination: output means for delivering direct current pulses to a utilization circuit including at least one battery or cell; means for connection to an A.C. power source; rectifying means for providing an unfiltered, rectified DC voltage; controlling circuit means and current pulse carrying means each coupled to receive output from said rectifying means; and current limiting means coupled between said means for connection to an A.C. power source and control inputs of said controlling circuit means and said current pulse carrying means for limiting current to control inputs thereof, said current pulse carrying means being coupled to said controlling circuit means and responsive to its output, said controlling circuit means being responsive to the instantaneous level of the unfiltered rectified D.C. voltage and voltage across the at least one battery or cell receiving charging pulses being delivered by the output means for controlling said current pulse carrying means to allow conduction thereof only during periods when the instantaneous level of the unfiltered D.C. voltage is substantially between a first level greater than the voltage across the at least one battery or cell receiving charging pulses being delivered by the output means and a second higher level which exceeds the first level by substantially a given amount and to prevent conduction during periods when the instantaneous level of the unfiltered D.C. voltage exceeds the second level, and wherein at least said rectifying means, said controlling circuit means and said current pulse carrying means are parts of an integrated circuit.

36. A battery charger including a direct current pulse producing integrated circuit having at least one parasitic transistor action which results in flow of undesired current at at least one circuit point comprising, in combination: output means for delivering current pulses to at least one battery or cell; means for connection to an A.C. power source; rectifying means for providing an unfiltered, rectified D.C. voltage; means for producing at the at least one circuit point a second current of substantially equal magnitude and opposite direction with respect to the undesired current to substantially negate the undesired current caused by the parasitic transistor action; and controlling circuit means and current pulse carrying means each coupled to receive output from said rectifying means, said current pulse carrying means being coupled to said controlling circuit means and responsive to its output, said controlling circuit means being responsive to the instantaneous level of the unfiltered rectified D.C. voltage and voltage across the at least one battery or cell receiving charging pulses being delivered by the output means for controlling said current pulse carrying means to allow conduction thereof only during periods when the instantaneous level of the unfiltered D.C. voltage is substantially between a first level greater than the voltage across the at least one battery or cell receiving charging pulses delivered by the output means and a second higher level which exceeds the first level by substantially a given amount and to prevent conduction during periods when the instantaneous level of the unfiltered D.C. voltage exceeds the second level.

37. A battery charger according to claim 36, wherein the integrated circuit includes a substrate and wherein said rectifying means comprises at least one diode, one electrode of said diode being constituted by at least one part of said substrate, its other electrode being formed in said substrate, and wherein said one and said other electrode constitute respectively a base and an emitter of at least one parasitic transistor which causes the undesired current at the at least one circuit point.

38. A battery charger according to claim 37, wherein said means for producing the second current to substantially negate the undesired current caused by the parasitic effect comprises at least one transistor forming a portion of the integrated circuit.

39. In a battery charger, a direct current pulse producing circuit comprised at least in part by an integrated circuit wherein at least one parasitic transistor action results in flow of undesired current at at least one circuit point and means for producing a second current of substantially equal magnitude and opposite direction with respect to the undesired current at the one circuit point to substantially negate the undesired current.

40. The battery charger according to claim 39, wherein the integrated circuit includes a plurality of circuit components, and wherein the at least one parasitic transistor action causes collection of carriers of one type by one of said circuit components acting as a collector of a parasitic transistor.

41. The battery charger according to claim 40, wherein the integrated circuit includes a substrate and a zone associated therewith, said zone and at least a portion of said substrate constituting a diode, said diode forming a base and an emitter of the parasitic transistor.

* * * * *